(12) United States Patent
Kowalczyk et al.

(10) Patent No.: US 11,009,670 B2
(45) Date of Patent: May 18, 2021

(54) HIGH FIBER COUNT TERMINATION DEVICE

(71) Applicant: COMMSCOPE TECHNOLOGIES LLC, Hickory, NC (US)

(72) Inventors: Scott C. Kowalczyk, Savage, MN (US); James J. Solheid, Lakeville, MN (US); Soutsada Vongseng, Chanhassen, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/488,455

(22) PCT Filed: Feb. 22, 2018

(86) PCT No.: PCT/US2018/019170
§ 371 (c)(1),
(2) Date: Aug. 23, 2019

(87) PCT Pub. No.: WO2018/156728
PCT Pub. Date: Aug. 30, 2018

(65) Prior Publication Data
US 2020/0249411 A1 Aug. 6, 2020

Related U.S. Application Data

(60) Provisional application No. 62/462,740, filed on Feb. 23, 2017.

(51) Int. Cl.
*G02B 6/44* (2006.01)

(52) U.S. Cl.
CPC ......... *G02B 6/4454* (2013.01); *G02B 6/4452* (2013.01)

(58) Field of Classification Search
CPC ........................... G02B 6/4454; G02B 6/4452
See application file for complete search history.

(56) References Cited

U.S. PATENT DOCUMENTS

| | | | | |
|---|---|---|---|---|
| 5,093,885 A | * | 3/1992 | Anton | G02B 6/4452 385/134 |
| 6,804,447 B2 | * | 10/2004 | Smith | G02B 6/4453 385/134 |

(Continued)

FOREIGN PATENT DOCUMENTS

| | | |
|---|---|---|
| EP | 0 356 942 A2 | 3/1990 |
| EP | 1 591 815 A1 | 11/2005 |
| WO | 2016/094331 A1 | 6/2016 |

OTHER PUBLICATIONS

International Search Report and Written Opinion of the International Searching Authority for International Patent Application No. PCT/US2018/019170 dated Jun. 5, 2018, 11 pages.

(Continued)

*Primary Examiner* — Ryan A Lepisto
(74) *Attorney, Agent, or Firm* — Merchant & Gould P.C.

(57) ABSTRACT

A termination enclosure includes a chassis configured to hold optical terminations and optical splices. The optical splices are mounted to a removable splice drawer. In certain examples, the splice drawer is removed through a rear of the chassis while the optical terminations remain at the chassis. Optical splices can be made at a workstation remote from the chassis and stored in the splice drawer, which is inserted back into the chassis.

23 Claims, 16 Drawing Sheets

(56) References Cited

U.S. PATENT DOCUMENTS

| | | | | |
|---|---|---|---|---|
| 6,850,685 B2* | 2/2005 | Tinucci | ................ | G02B 6/4455 |
| | | | | 385/134 |
| 6,925,241 B2* | 8/2005 | Bohle | ................ | G02B 6/4455 |
| | | | | 385/134 |
| 7,031,588 B2* | 4/2006 | Cowley | ................ | G02B 6/4452 |
| | | | | 312/323 |
| 7,142,764 B2* | 11/2006 | Allen | ................ | G02B 6/4454 |
| | | | | 385/135 |
| 7,200,316 B2* | 4/2007 | Giraud | ................ | G02B 6/4452 |
| | | | | 385/135 |
| 7,330,626 B2* | 2/2008 | Kowalczyk | .......... | G02B 6/4452 |
| | | | | 385/134 |
| 7,570,860 B2 | 8/2009 | Smrha et al. | | |
| 7,570,861 B2 | 8/2009 | Smrha et al. | | |
| 7,715,681 B2* | 5/2010 | Krampotich | ......... | G02B 6/4455 |
| | | | | 385/134 |
| 7,764,859 B2* | 7/2010 | Krampotich | ......... | G02B 6/4455 |
| | | | | 385/135 |
| 8,154,886 B2* | 4/2012 | Hendrix | ............ | H05K 7/20563 |
| | | | | 361/728 |
| 8,348,517 B2 | 1/2013 | Mudd et al. | | |
| 8,422,846 B2 | 4/2013 | Ruiz et al. | | |
| 9,435,976 B2 | 9/2016 | Smrha et al. | | |
| 9,690,066 B2 | 6/2017 | Smrha et al. | | |
| 9,703,059 B2 | 7/2017 | Smrha et al. | | |
| 9,720,199 B2* | 8/2017 | Mead | ..................... | G02B 6/445 |
| 9,778,433 B2* | 10/2017 | Kostecka | ............. | G02B 6/4454 |
| 9,904,028 B2* | 2/2018 | Kioski | ................ | G02B 6/4452 |
| 10,025,055 B2* | 7/2018 | Alexi | ................... | G02B 6/4455 |
| 10,274,690 B2* | 4/2019 | Hoskins | ............... | G02B 6/4452 |
| 2004/0013387 A1 | 1/2004 | Wakileh et al. | | |
| 2007/0189691 A1 | 8/2007 | Barth et al. | | |
| 2010/0322579 A1 | 12/2010 | Cooke et al. | | |
| 2011/0052133 A1* | 3/2011 | Simmons | ............ | G02B 6/4455 |
| | | | | 385/135 |
| 2011/0268414 A1 | 11/2011 | Giraud et al. | | |
| 2013/0243386 A1 | 9/2013 | Pimentel et al. | | |
| 2014/0348480 A1* | 11/2014 | Giraud | ................ | G02B 6/4454 |
| | | | | 385/135 |
| 2019/0072736 A1* | 3/2019 | Glatzl | ................. | G02B 6/4455 |

OTHER PUBLICATIONS

"R&M introduces Anaconda: high capacity fiber distribution for today's Data Centers", R&M, Press Release, 3 pages (2016).
"RDM Anaconda Modular Rack Mount Splice System", R&M, 1 page (2017).
Instructions for Using Anaconda Break-out Box, R&M, 2 pages (2016).
Extended European Search Report for corresponding European Patent Application No. 18757261.5 dated Nov. 5, 2020, 7 pages.

* cited by examiner

HIGH FIBER COUNT TERMINATION DEVICE

CROSS-REFERENCE TO RELATED APPLICATION

This application is a National Stage Application of PCT/US2018/019170, filed on Feb. 22, 2018, which claims the benefit of U.S. Patent Application Ser. No. 62/462,740, filed on Feb. 23, 2017, the disclosures of which are incorporated herein by reference in their entireties. To the extent appropriate, a claim of priority is made to each of the above disclosed applications.

BACKGROUND

In fiber optic telecommunications systems, it is common for optical fibers of transmission cables to be split into multiple strands. Further, when such systems are installed, it is known to provide excess capacity in the installations to support future growth and utilization of the fibers. Often in these installations, modules including splitters or multiplexers may be used to provide the connection between transmission fibers and customer fibers.

Improvements are required.

SUMMARY

Some aspects of the disclosure are directed to a termination enclosure having a chassis configured to hold optical terminations and optical splices. The optical splices are mounted to a splice tray mounting arrangement that is removably coupled to the chassis. In certain examples, the splice tray mounting arrangement can be removed through a rear of the chassis while the optical terminations remain at the chassis.

In some implementations, the optical terminations are disposed towards a front of the chassis and have external ports and internal ports. The internal ports are pre-cabled so that optical fibers extend rearwardly from the internal ports, through an interior of the chassis, to the splice tray mounting arrangement. Excess length of the optical fibers can be stored in coils at the splice tray mounting arrangement.

After installation of the termination enclosure, a user can route a cable to the termination enclosure to optically couple (e.g., splice) fibers of the cable to the optical fibers pre-cabled within the chassis. The splice tray mounting arrangement is removed from the termination enclosure and moved to a splicing workstation. For example, the excess length of the optical fibers may be unwound from the splice tray mounting arrangement (e.g., by rotating the splice tray mounting arrangement) as the A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
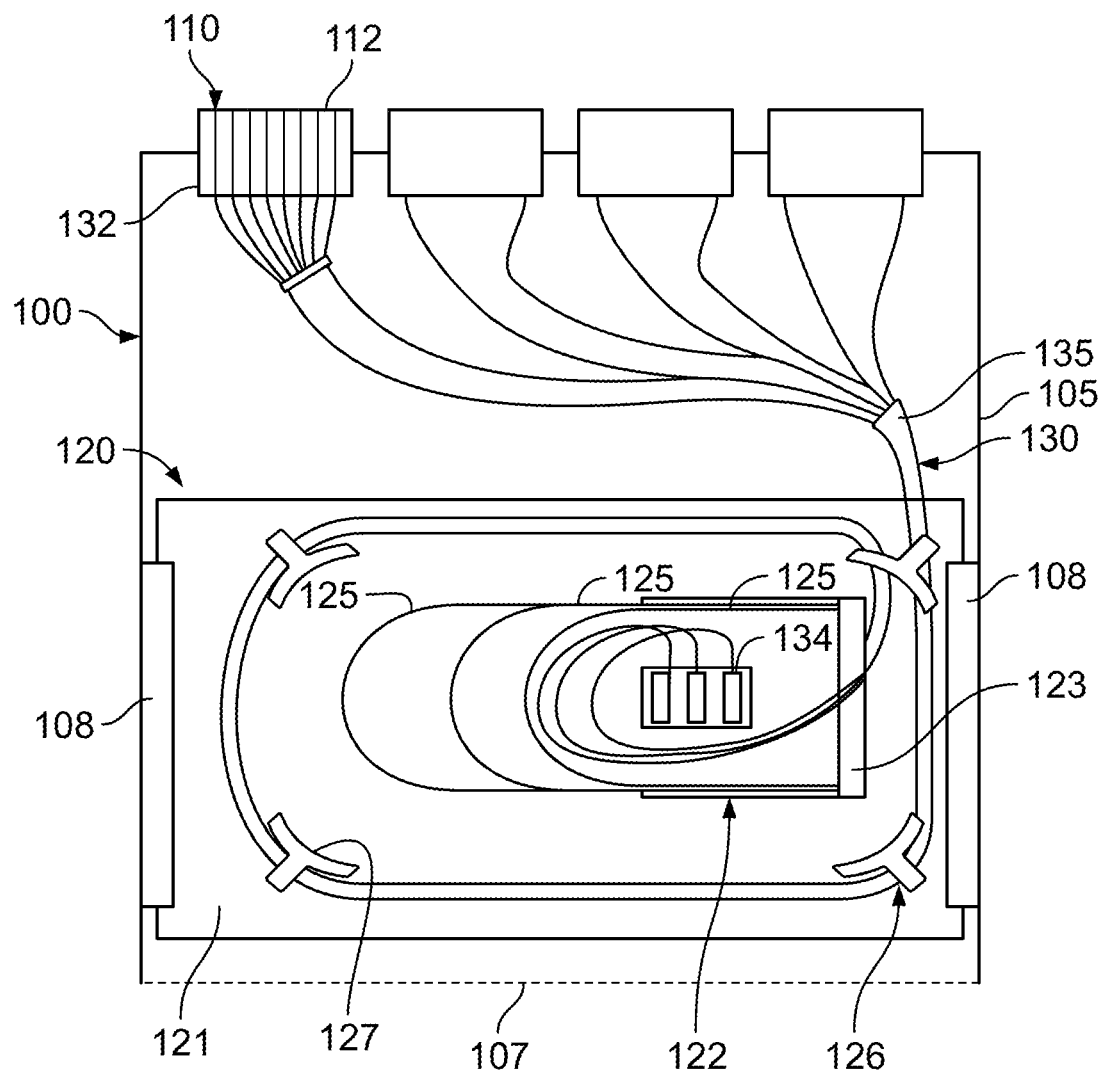
FIG. 1 is a schematic drawing of an example fiber distribution terminal configured in accordance with the principles of the present disclosure, the fiber distribution terminal including a chassis having a removable splice tray mounting arrangement disposed within the chassis.

The present disclosure is directed to a fiber distribution terminal 100 including a chassis 105; a plurality of optical adapters 112 disposed at the chassis; and a splice tray mounting arrangement 120 that is removably coupled to the chassis 105. Referring to FIG. 1, one of more splice trays 125 can be disposed at the splice tray mounting arrangement 120. Fibers 131 extend rearwardly from connectorized ends 132 at internal ports of the optical adapters 112 to the splice tray mounting arrangement 120. The fibers 131 can be gathered in one or more distribution cables 130. Unterminated ends 134 of the fibers 131 are either routed to the splice trays 125 or otherwise managed at the splice tray mounting arrangement 120.

Figure 2:
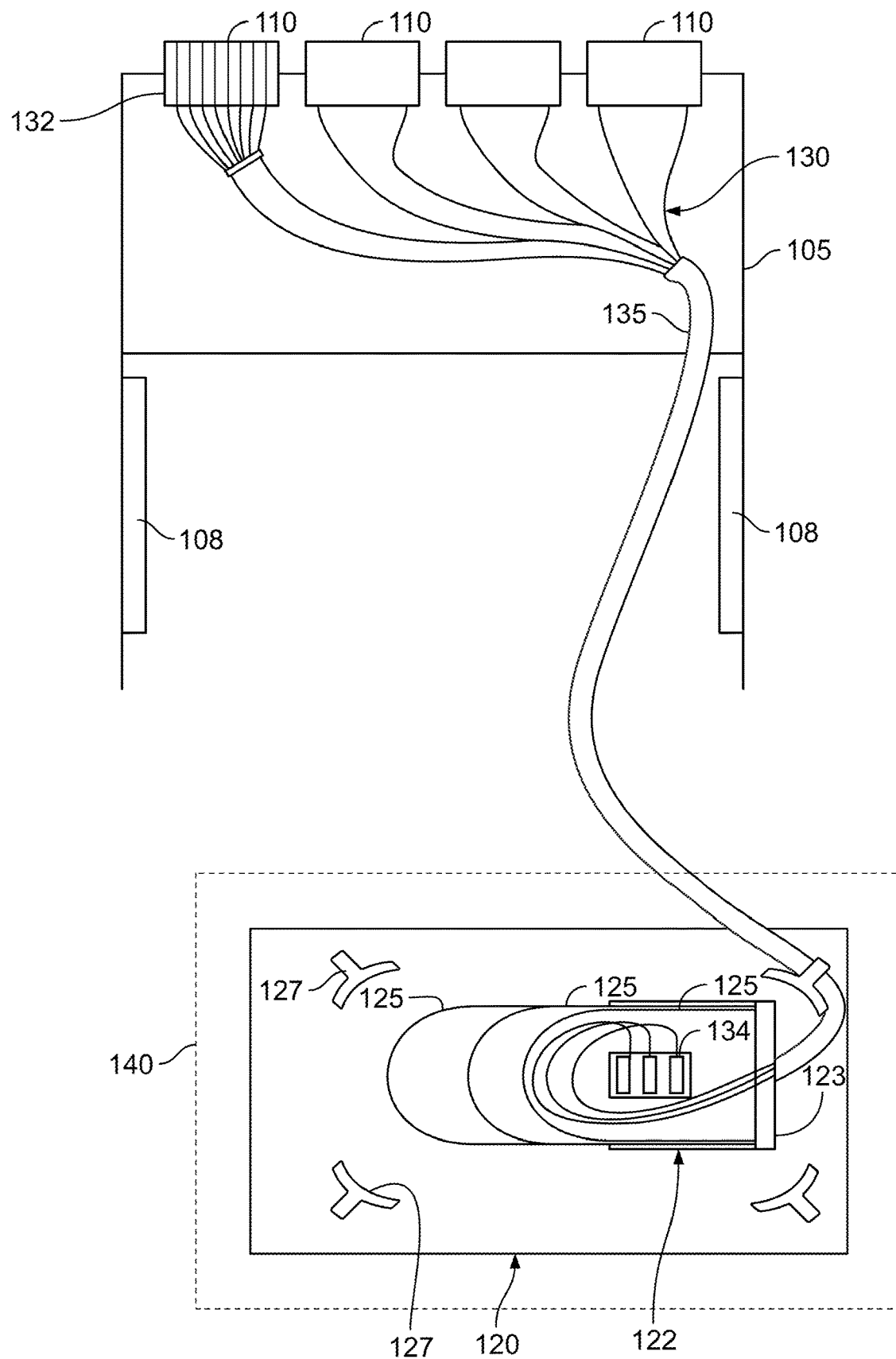
FIG. 2 is a schematic drawing of the fiber distribution terminal of FIG. 1 having the splice tray mounting arrangement displaced from the chassis to a workstation outside of the chassis.

Referring to FIG. 2, to connect the distribution terminal 100 to a network, a user removes the splice tray mounting arrangement 120 from the chassis 105 through the rear of the chassis 105. The user moves the splice tray mounting arrangement 120 to a workstation 140, e.g., by loosening excess length of the fibers 131 to allow the splice tray mounting arrangement 120 to reach the workstation 140 while the fibers 131 remain connected to the internal ports of the optical adapters 112. The user routes a network cable to a rear of the chassis 105 and anchors the network cable at the chassis 105. The user then routes an unterminated end of the network cable to the workstation 140.

At the workstation 140, the user optically splices the unterminated ends 134 of the optical fibers 131 to the fibers of the network cable (e.g., via one or more mass fusion splices). The user then moves the splice tray mounting arrangement 120 back towards the chassis 105. In certain examples, the user stores excess length of both the fibers 131 and the network cable on the splice tray mounting arrangement 120 as the user moves the splice tray mounting arrangement 120 to the chassis 105. For example, the user may wind the excess length of both the fibers 131 and the network cable into one or more coils that can be stored at (e.g., on, around, or near) the splice tray mounting arrangement 120. The user inserts the splice tray mounting arrangement 120 into the chassis 105 through the rear.

Figure 3:
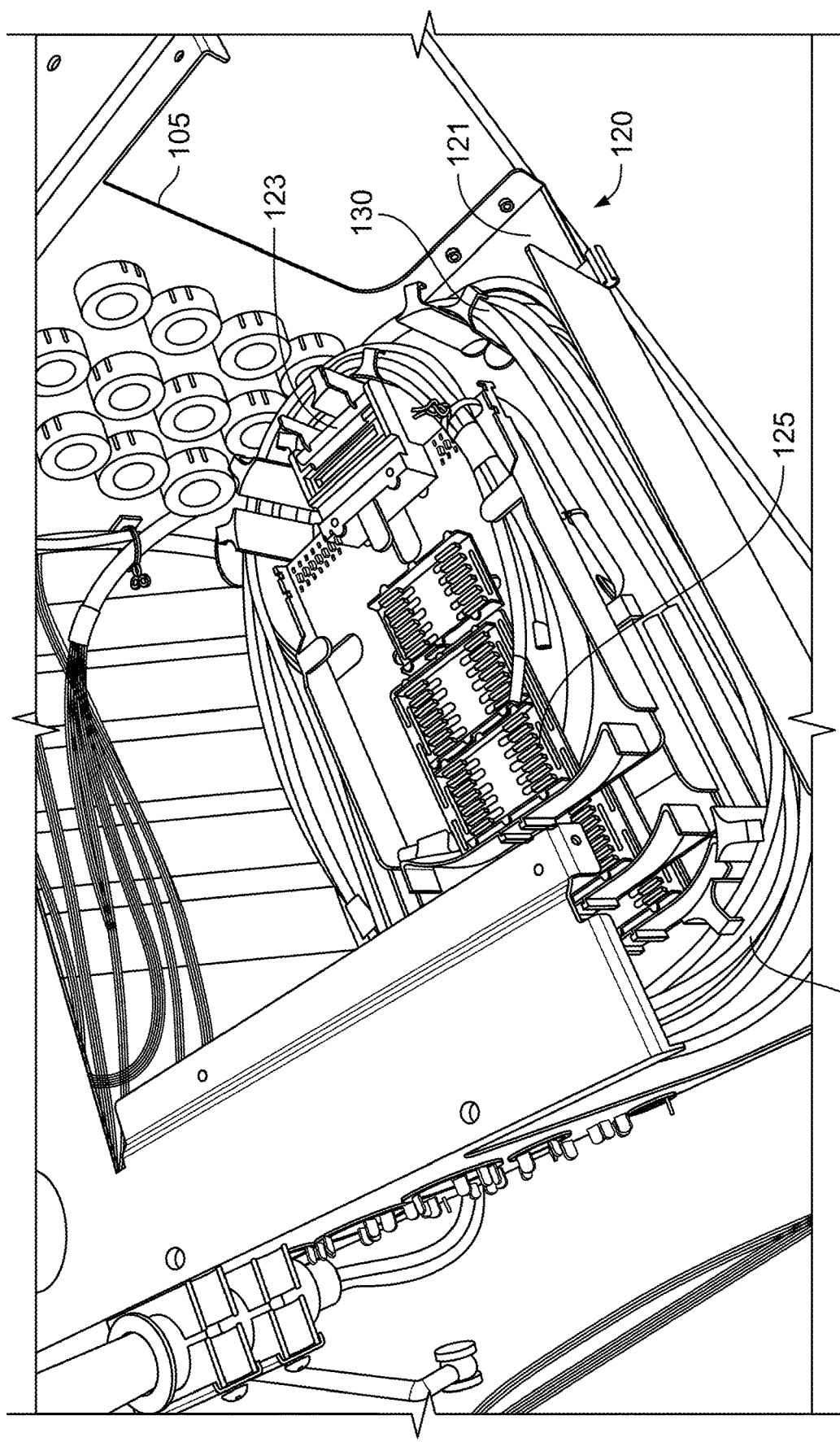
FIG. 3 is a top, rear perspective view of an example fiber distribution terminal configured in accordance with the principles of the present disclosure, the fiber distribution terminal including a chassis and a removable splice tray mounting arrangement; the chassis having a rear cover removed for ease in viewing the splice tray mounting arrangement.
Figure 4:
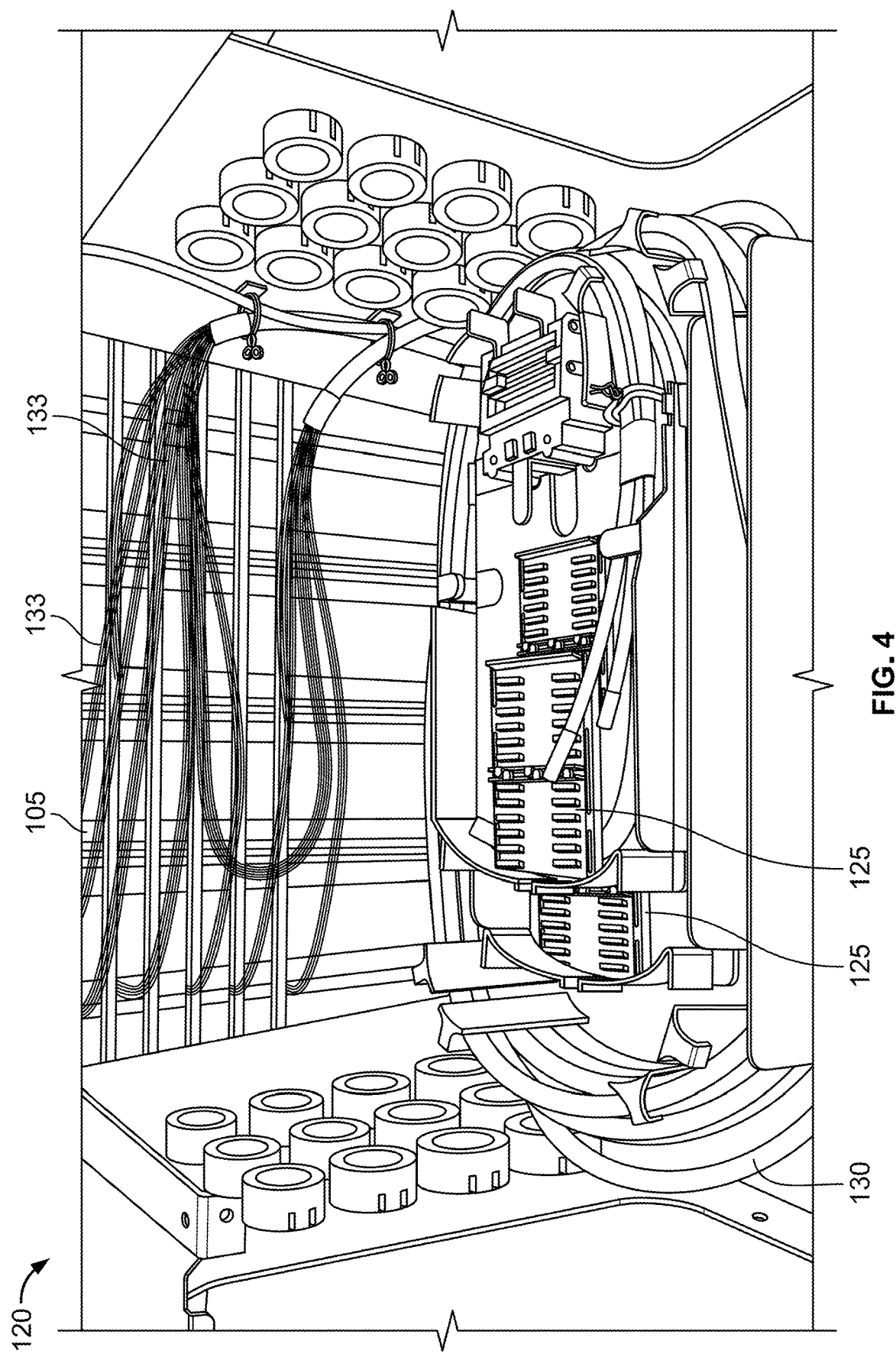
FIG. 4 is a rear perspective view of the fiber distribution terminal of FIG. 3.

FIGS. 3 and 4 illustrate one example configuration 120A for a splice tray mounting arrangement 120 suitable for use within a chassis 105. The splice tray mounting arrangement 120A is disposed towards a bottom of the chassis 105. Two splice trays 125A are shown stacked in an offset configuration on the splice tray mounting arrangement 120A. The excess length of the fibers 131 are shown wrapped around bend radius limiters carried by the splice tray mounting arrangement 120A.

Figure 5:
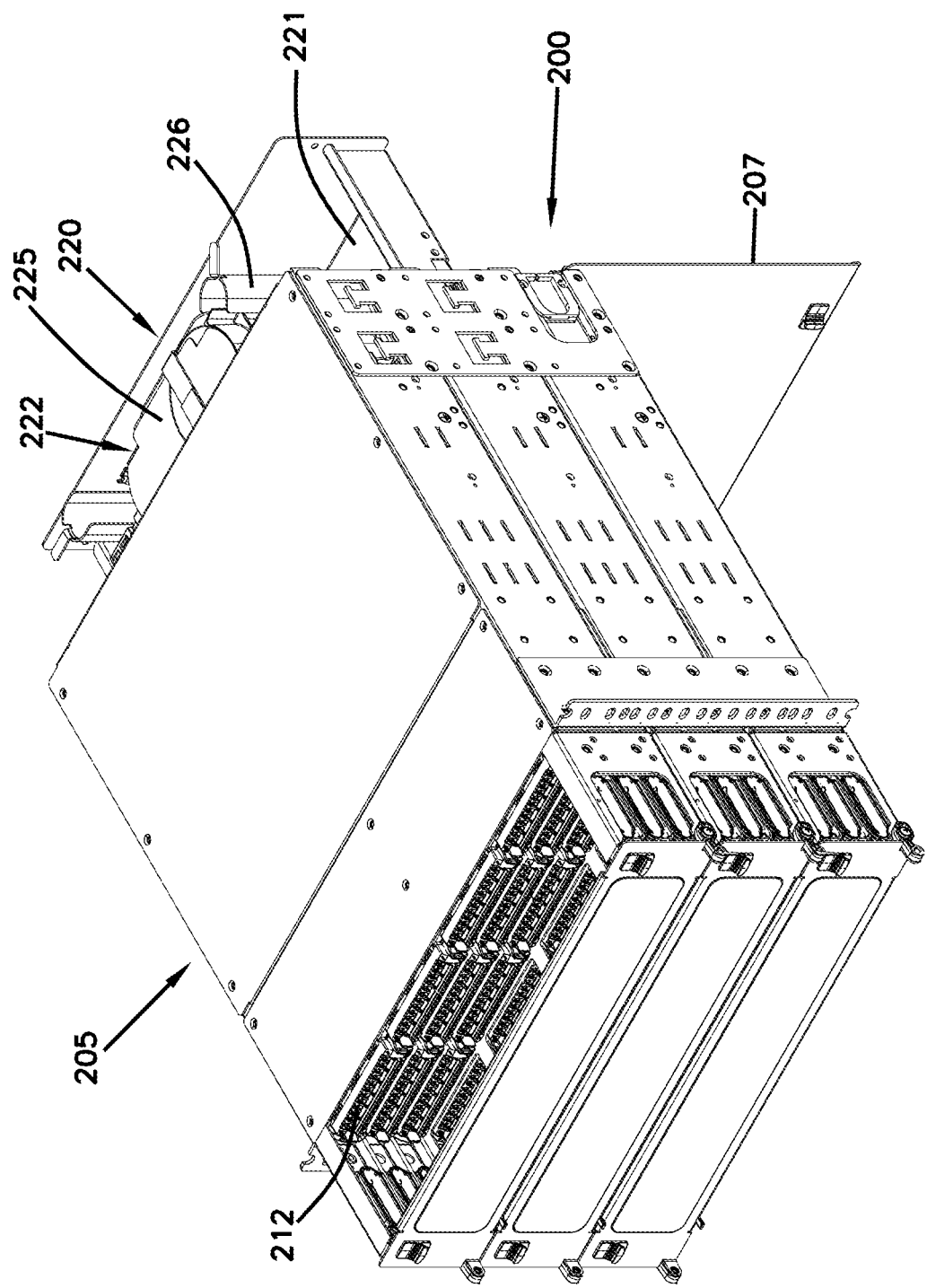
FIG. 5 is a top, front perspective view of an example fiber distribution terminal configured in accordance with the principles of the present disclosure, the fiber distribution terminal including a chassis and a removable splice tray mounting arrangement.

FIG. 5 illustrates an example configuration 200 of a fiber distribution terminal 100. The example fiber distribution terminal 200 includes a chassis 205, a plurality of optical adapters 212, and a removable splice tray mounting arrangement 220. As noted above with respect to FIGS. 1 and 2, a user can remove the splice tray mounting arrangement 220 from the chassis 205 and move the splice tray mounting arrangement 220 to a workstation 240 for splicing work.

Optical fibers 231 extend rearwardly from the optical adapters 212. In certain implementations, the optical fibers 231 are grouped as one or more distribution cables 230. In some implementations, the distribution cable 230 includes a plurality of ribbons 233 of the optical fibers 231. In other implementations, the distribution cable 230 includes a plurality of loose fibers 231. In certain examples, one or more distribution cables 230 can be protected within mesh sleeves as the cables extend to the splice tray mounting arrangement 220. First ends of the fibers 231 are connectorized and plugged into internal ports of the adapters 212. In certain examples, the first ends of the fibers 231 and internal ports are disposed within the cassette 210. Second ends of the fibers 231 are unconnectorized and routed towards the splice tray mounting arrangement 220.

Figure 6:
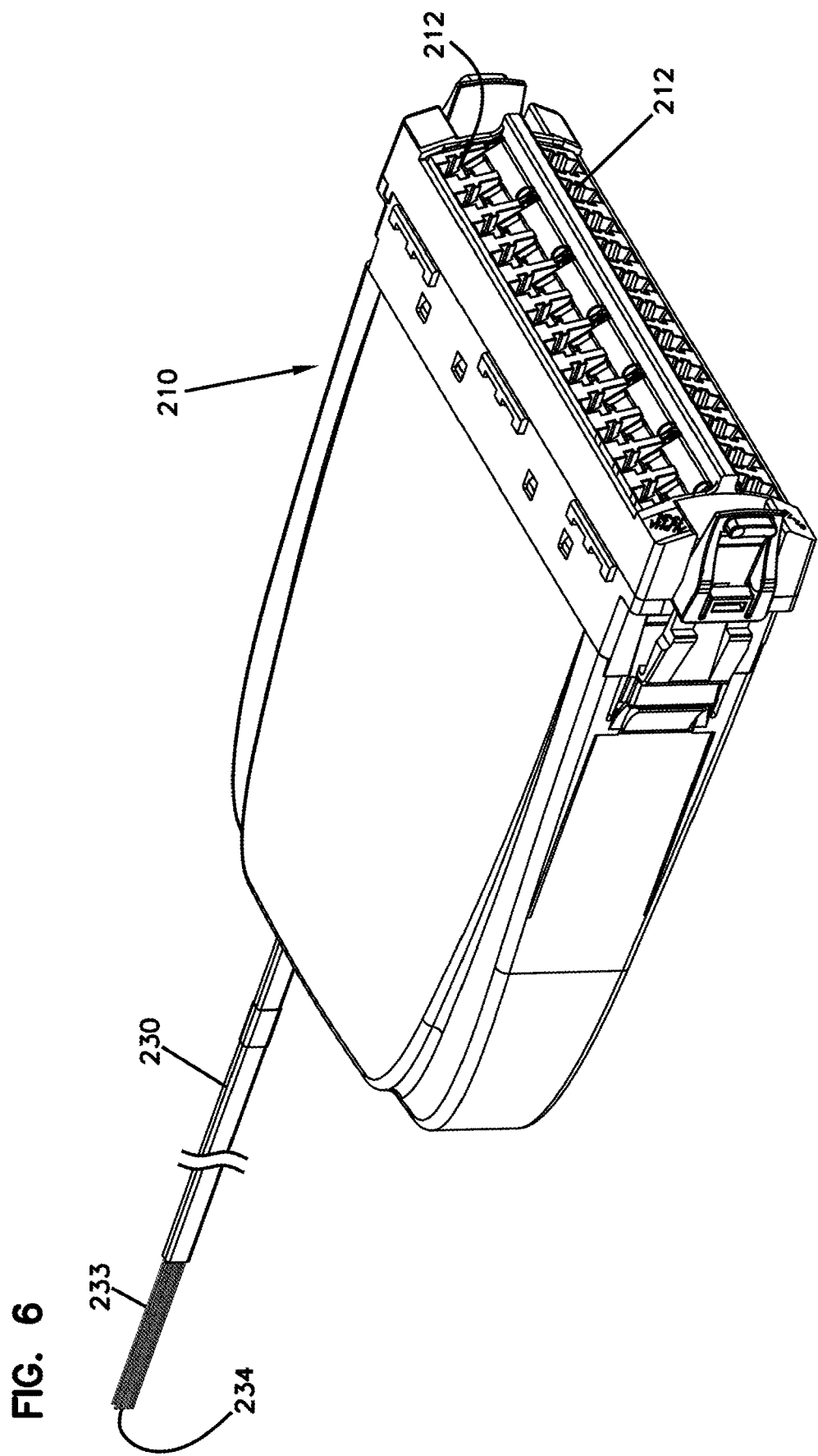
FIG. 6 is a perspective view of an example cassette suitable for use in any of the fiber distribution terminals shown in FIGS. 1-5.

In some implementations, the optical adapters 212 are grouped in one or more adapter blocks. In other implementations, the optical adapters 212 are carried by one or more cassettes 210. An example cassette 210 is shown in FIG. 6. The cassette 210 is configured to latch or otherwise mount to the chassis 205, e.g., at a front of the chassis 205. The cassette 210 holds a row of optical adapters 212. In the example shown, the cassette 210 holds two rows of optical adapters 212. In other examples, the cassette 210 can hold any number of adapters 212 in any desired configuration. In certain examples, the internal ports and connectorized ends of the fibers 231 are disposed within the cassette 210. One or more distribution cables 230 extend rearwardly from the cassette 210.

Figure 7:
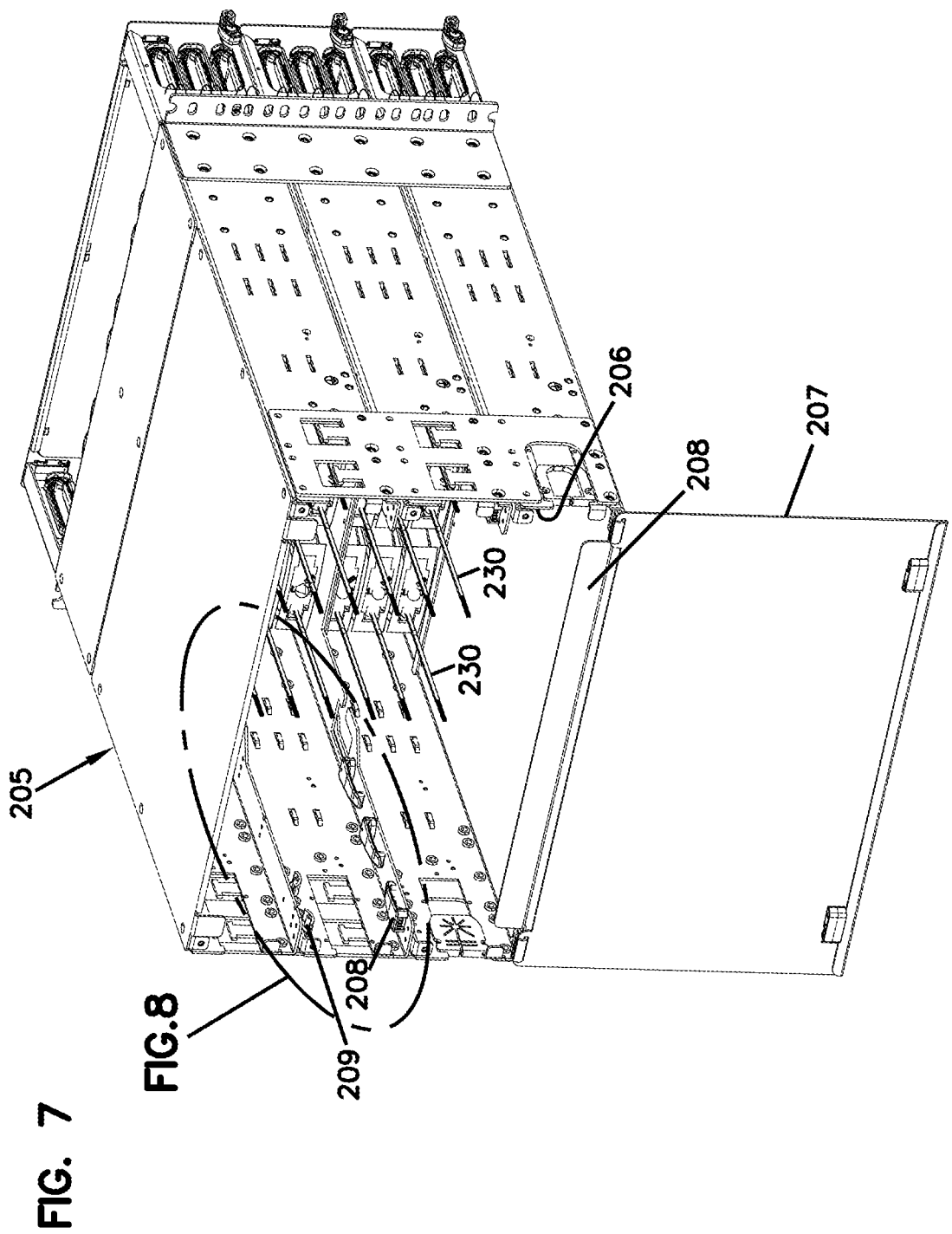
FIG. 7 is a top, rear perspective view of the fiber distribution terminal of FIG. 5 with the splice tray mounting arrangement removed from the chassis.
Figure 8:
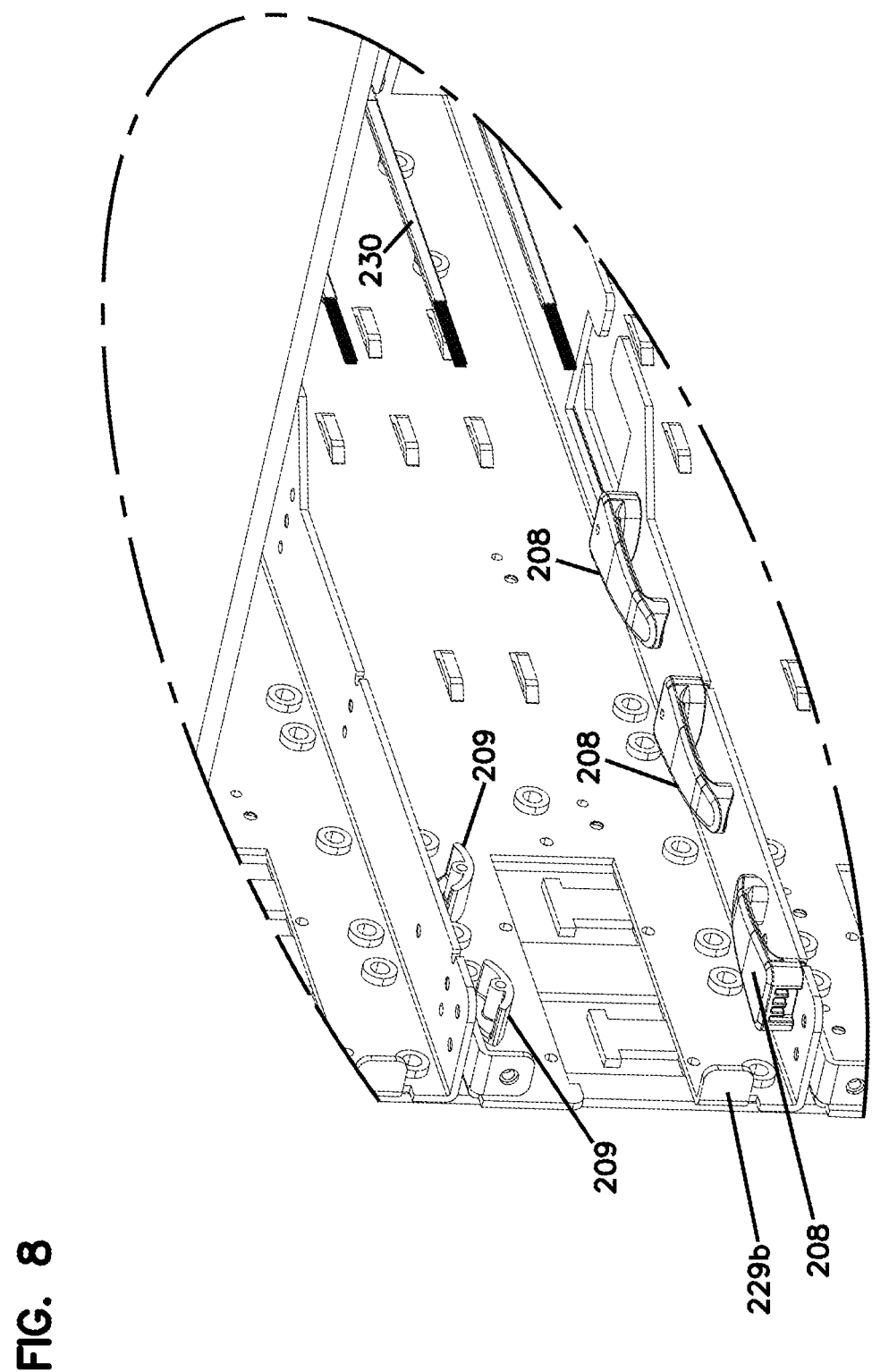
FIG. 8 is an enlarged view of a portion of FIG. 7.

As shown in FIGS. 7 and 8, the chassis 205 defines an interior accessible through an open rear 206. A rear door 207 is configured to selectively cover the open rear 206. For example, the rear door 207 can pivot relative to the chassis 205 to expose the open rear 206. In the example shown, the rear door 207 pivots downwardly. In certain examples, a lip 208 may be provided at the open rear 206 to aid in retaining excess length of the fibers 231 within the chassis 205.

In certain implementations, the chassis 205 is configured to receive the splice tray mounting arrangement 220. For example, the chassis 205 may include guides or tracks along which the splice tray mounting arrangement 220 moves into and out of the chassis 205. In certain examples, the guides include one or more bottom glides 208 and one or more top glides 209 along which the splice tray mounting arrangement 220 can slide. The bottom and top glides 208, 209

In certain examples, the guides are disposed at a bottom of the chassis 205. In the example shown, however, the guides are disposed at an intermediate location along the height of the chassis 205. Accordingly, the splice tray mounting arrangement 220 is suspended above a bottom of the chassis 205. Positioning the splice tray mounting arrangement 220 at the intermediate location along the height allows for the use of a common length of fibers 231 extending from the optical adapters 212. Positioning the splice tray mounting arrangement 220 at the intermediate location along the height also allows for room to store excess fiber or cable length beneath the splice tray mounting arrangement 220.

Figure 9:
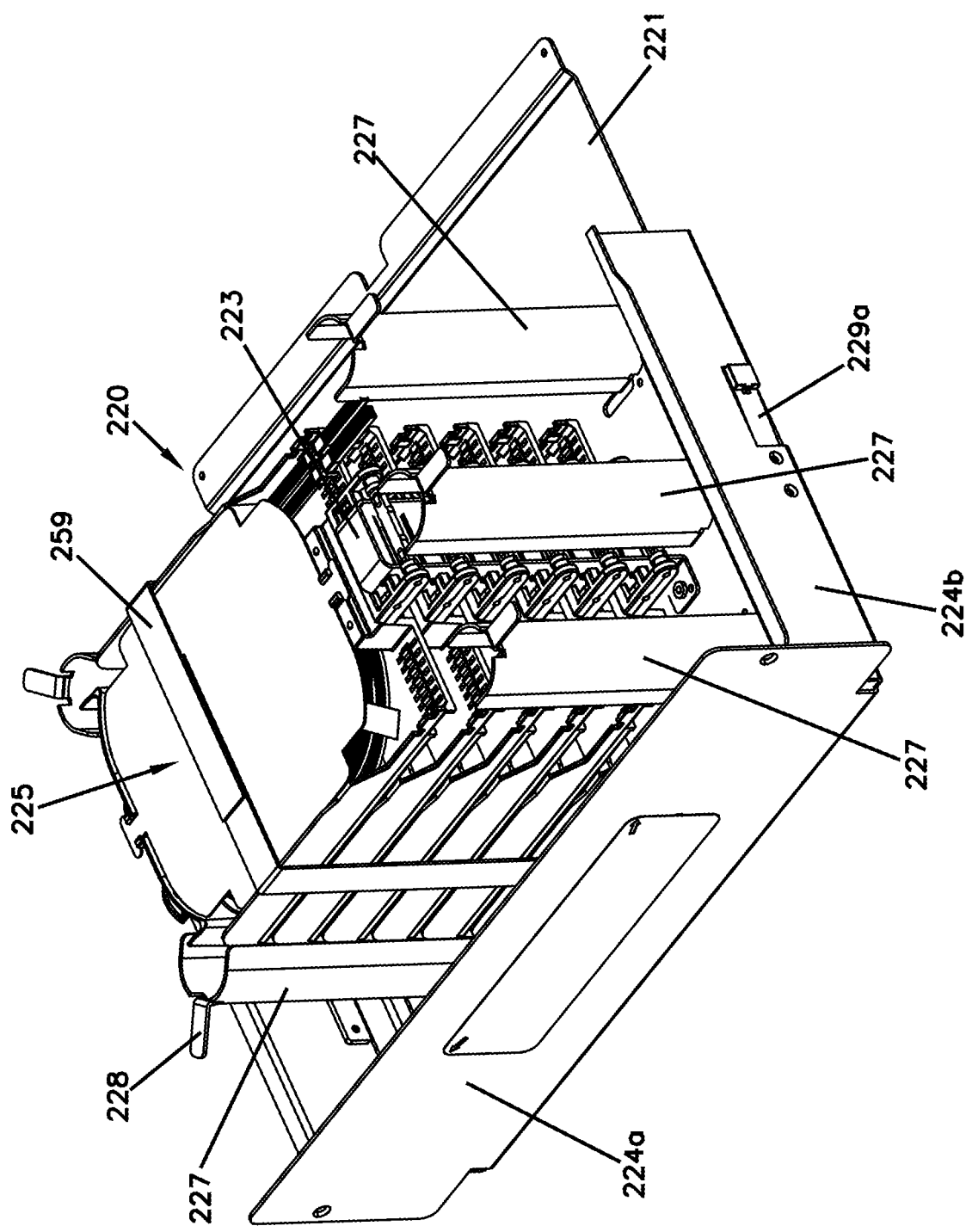
FIG. 9 is a perspective view of an example splice tray mounting arrangement suitable for use with the terminal of FIG. 5.
Figure 10:
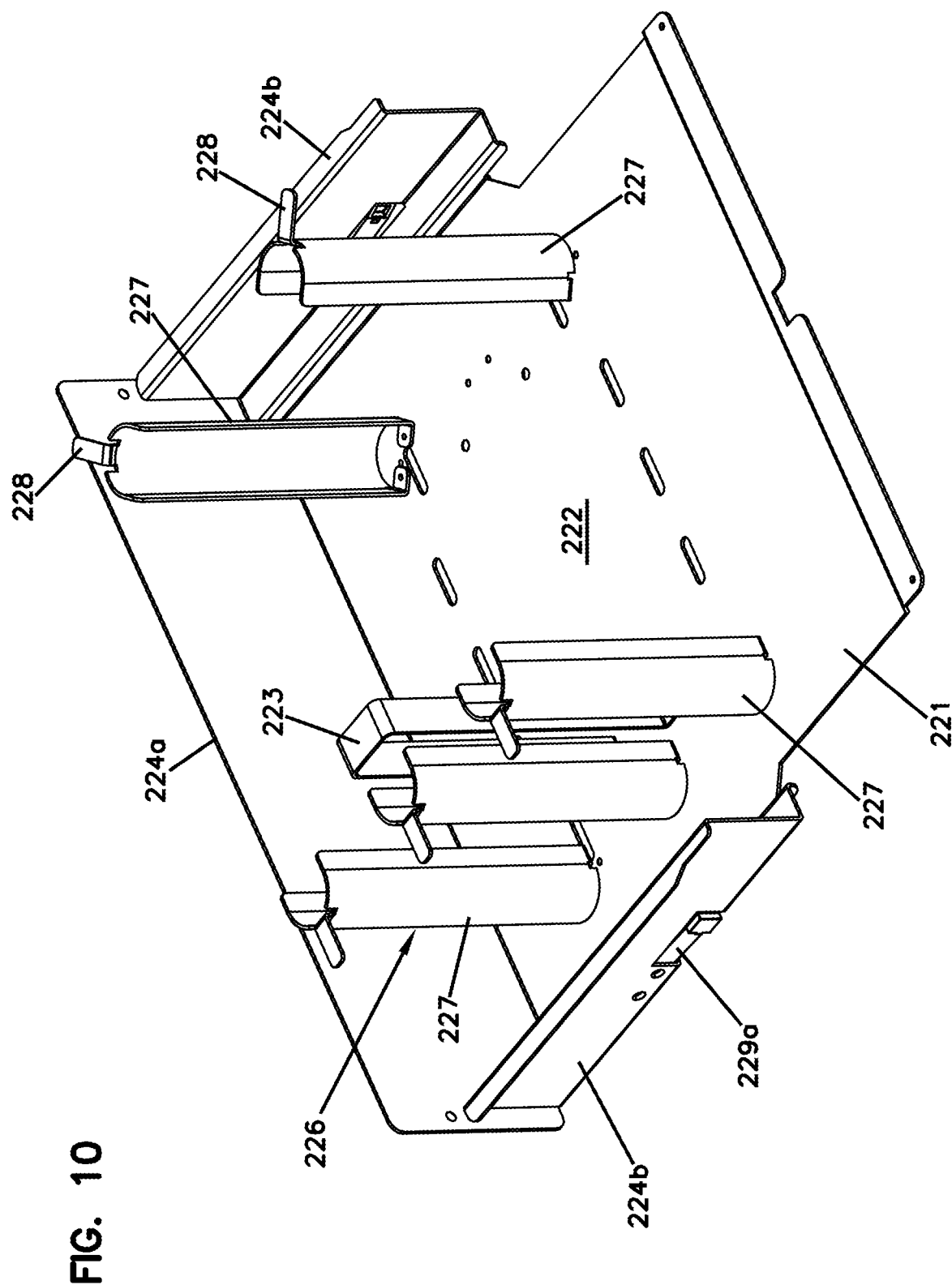
FIG. 10 is a perspective view of the splice tray mounting arrangement of FIG. 9 with the splice trays unloaded.

FIGS. 9 and 10 illustrate an example splice tray mounting arrangement 220 suitable for use with the chassis 205. The splice tray mounting arrangement 220 includes a base 221 carrying a splice tray mounting location 222 so that removing the splice tray mounting arrangement 220 from the chassis 205 also removes the splice tray mounting location 222 from the chassis 205. The splice tray mounting location 222 is configured to receive a plurality of splice trays 225. In certain implementations, the splice tray mounting arrangement 220 is a drawer including a rear wall 224a and side walls 224b extending upwardly from the base 221. The rear wall 224a and side walls 224b may aid in retaining excess length of the fibers and/or cables within the drawer.

In certain implementations, the splice tray mounting arrangement 220 includes a tray retention member 223 extending upwardly from the base 221 (see FIG. 10). One or more splice trays 225 may be coupled to the tray retention member 223. Certain types of splice trays 225 include a mounting member 252 that defines an aperture 253 through which the tray retention member 223 extends. For example, the trays 225 may be slid over the retention member 223 so that the splice trays 225 stack one over the other. The splice trays 225 may be secured to the splice tray mounting arrangement 220 using a fastener (e.g., a Velcro® strip) 259 (see FIG. 9).

The splice tray mounting arrangement 220 also includes a bend radius management arrangement 226 carried by the base 221. The bend radius management arrangement 226 is configured to route an optical cable 230 or fibers 231 around the splice tray mounting location 222 to store excess length of the optical cable 230 or fibers 231. In the example shown, the bend radius management arrangement 226 includes a plurality of bend radius limiters 227 that extend upwardly from the base 221. Tabs 228 may extend radially outwardly from distal ends of the bend radius limiters 227. In certain examples, the bend radius limiters 227 are sufficiently tall to reach a top splice tray 225 on the stack.

In certain implementations, the splice tray mounting arrangement 220 includes a latching arrangement that selectively retains the splice tray mounting arrangement 220 at a set position relative to the chassis 205. In some examples, the latching arrangement retains the splice tray mounting arrangement 220 at a position fully inserted within the chassis 205. In other examples, the latching arrangement retains the splice tray mounting arrangement 220 at a partially removed position relative to the chassis 205 to inhibit accidental or unexpected removal of the splice tray mounting arrangement 220 from the chassis 205.

In the example shown in FIG. 10, the latching arrangement includes flexible, cantilevered latch arms 229a disposed at opposite side walls 224b of the splice tray mounting arrangement 220. Stops at the distal ends of the latch arms 229a automatically engage shoulders 229b defined by the chassis 205 when the splice tray mounting arrangement 220 is moved relative to the chassis 205 into the partially removed position. Complete removal of the splice tray mounting arrangement 220 from the chassis 205 is accomplished by deflecting the latch arms 229a inwardly until the stops clear the shoulders 229b and pulling the splice tray mounting arrangement 220 out through the open rear 206 of the chassis 205.

Figure 11:
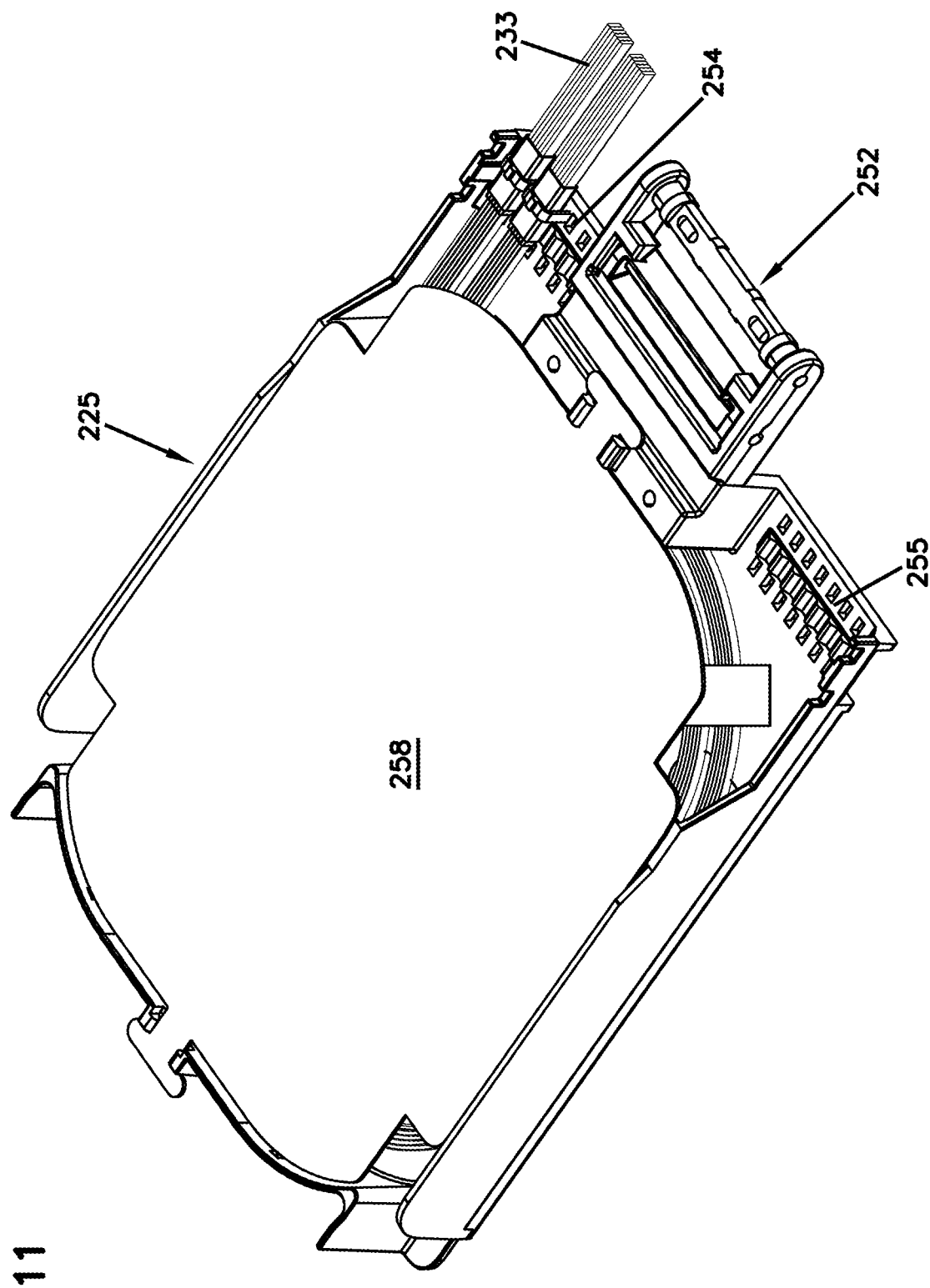
FIG. 11 is a perspective view of an example splice tray configured to mount to the splice tray mounting arrangement of FIG. 9.
Figure 12:
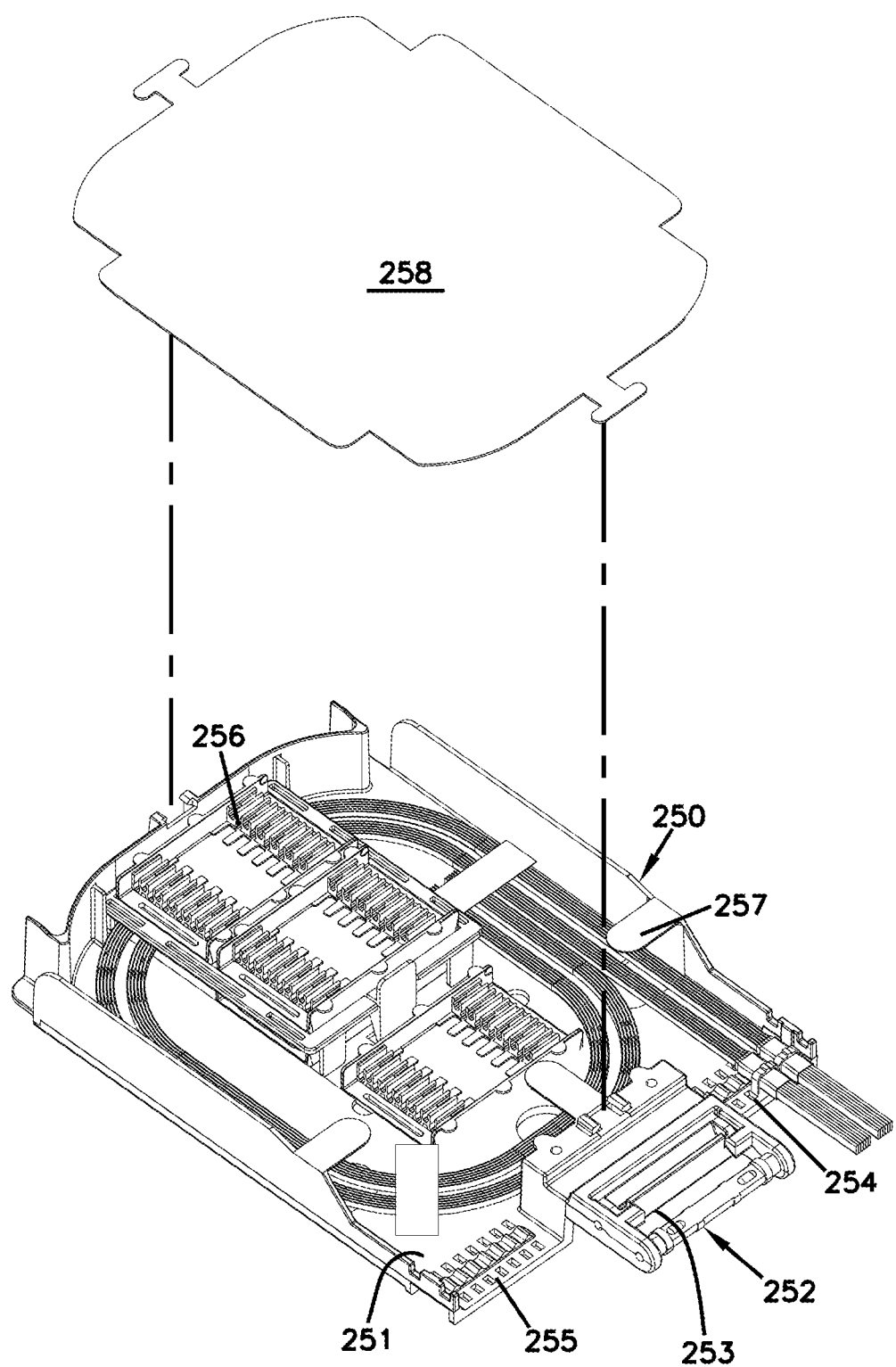
FIG. 12 is an exploded view of the splice tray of FIG. 11.
Figure 13:
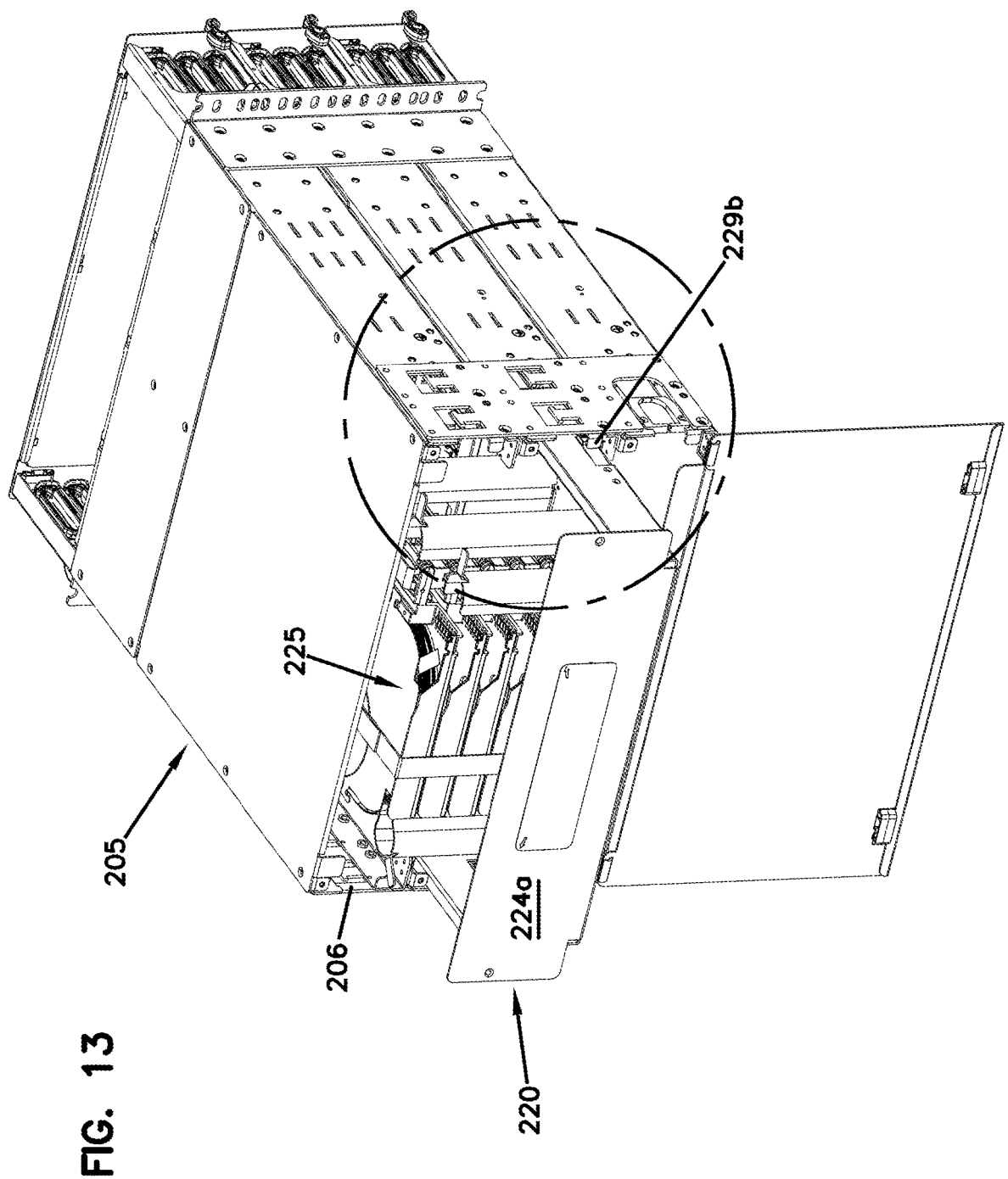
FIG. 13 is a top, rear perspective view of the fiber distribution terminal of FIG. 5.
Figure 14:
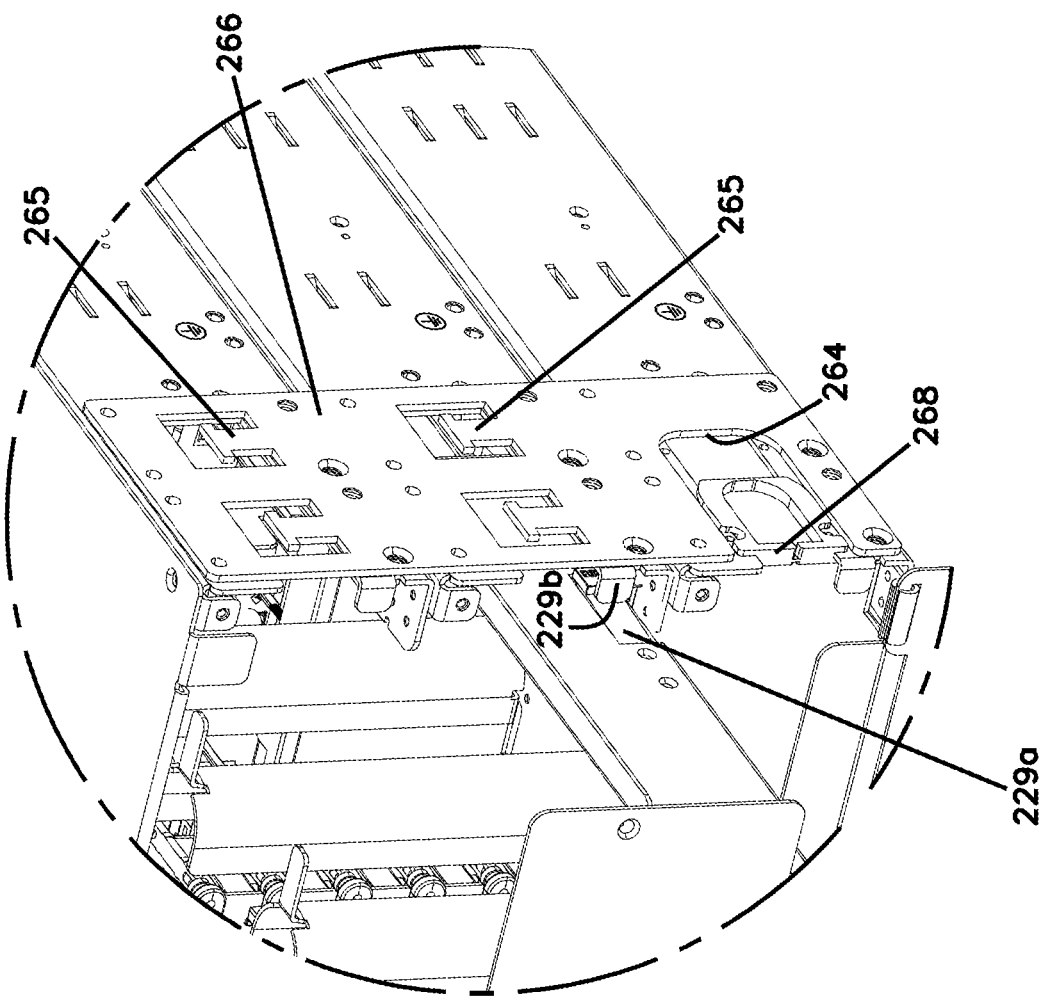
FIG. 14 is an enlarged view of a portion of FIG. 13.
Figure 15:
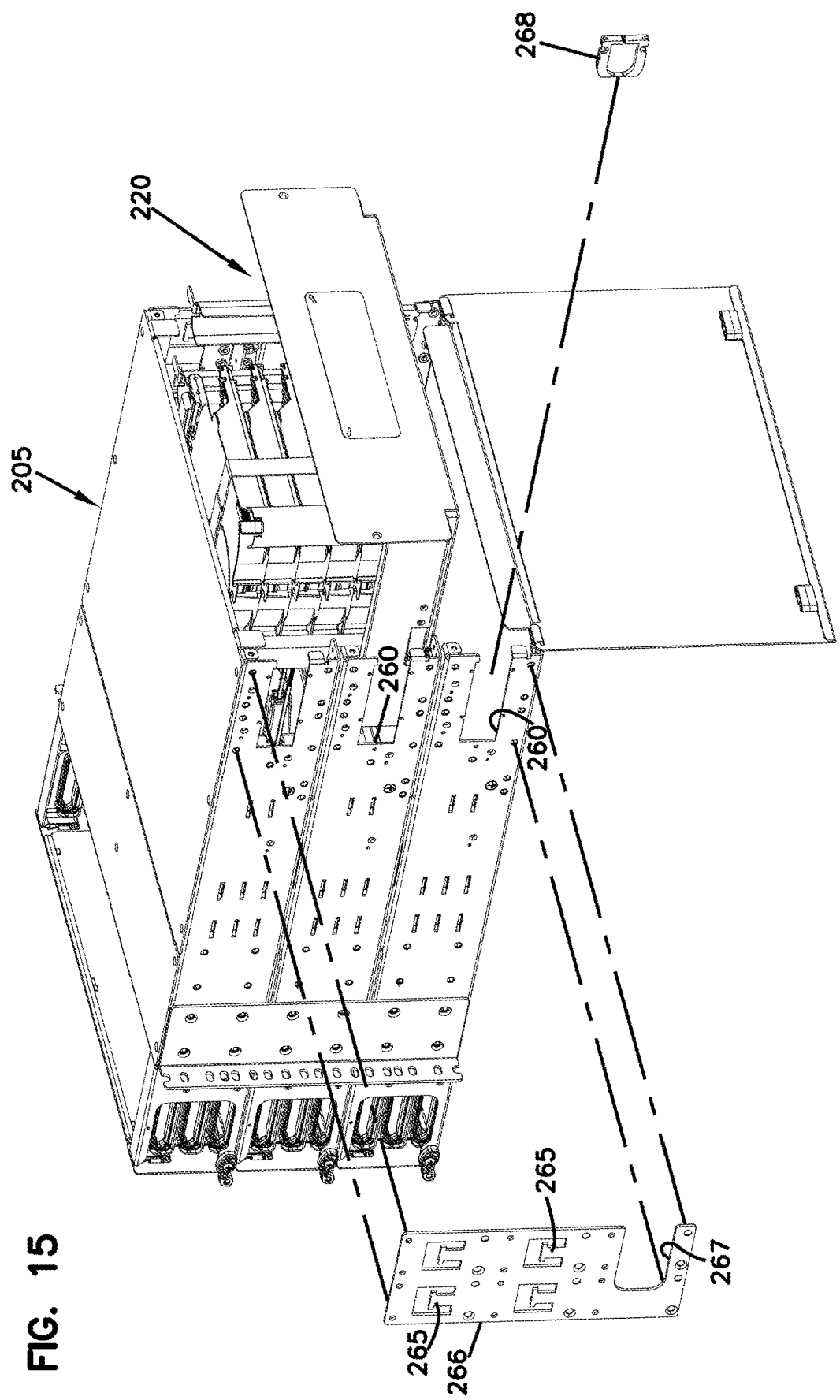
FIG. 15 is a perspective view of the fiber distribution terminal of FIG. 5 with an anchor plate and a gasket exploded away from the chassis.
Figure 16:
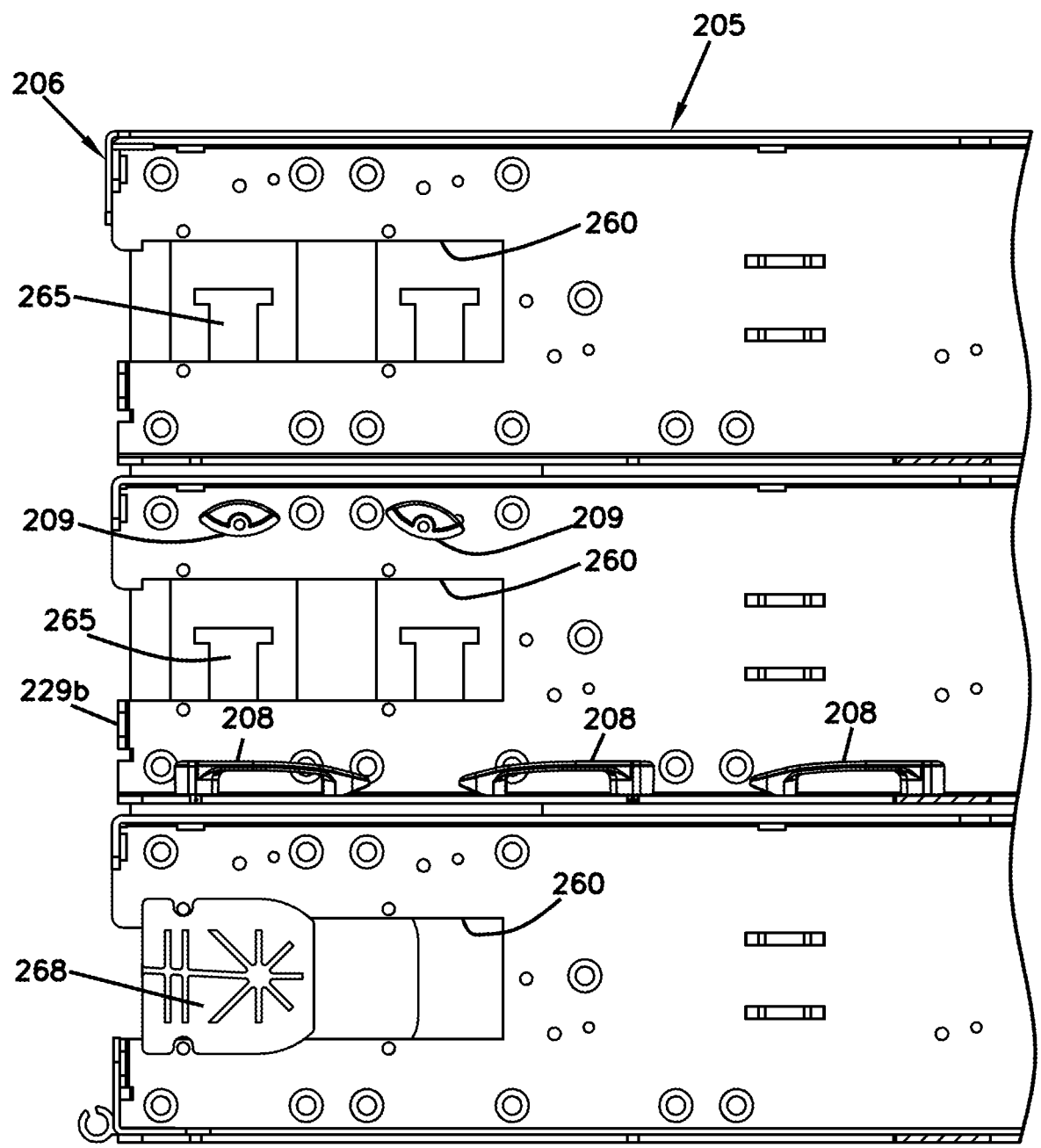
FIG. 16 is a side elevational view of an inner surface of a chassis sidewall where the top and bottom glides are visible.

FIGS. 11 and 12 illustrate an example splice tray 225 suitable for use with the splice tray mounting arrangement 220. The splice tray 225 includes a base 250 and cover 258 that cooperate to protect one or more optical splices. The splice tray 225 has a first entrance 254 for the optical fibers 231 or cable 230. The splice tray 225 has a second entrance 255 for a network cable to which the optical fibers 231 are to be optically coupled. The fibers (e.g., fiber ribbons 233) may be secured to the entrances 254, 255 via cable ties or other structures (e.g., see FIG. 12). As shown, some excess length of the optical fibers 231 is routed around the splice tray 225. Tabs 257 may extend inwardly over the base to aid in retaining the fibers 231 within the tray 225. Optical splice holders 256 are disposed on the splice tray 225 between the base 251 and the cover 258. FIGS. 13-16 illustrate how the network cable can be attached to the chassis 205. The sidewalls of the chassis 205 define one or more apertures 260 towards the rear end 206. Fibers from the network cable can be routed into the chassis 205 through one or more of these apertures 260.

In certain implementations, cable anchoring can be provided at the chassis sidewall. For example, an anchor insert 266 may be mounted to the chassis sidewall. In certain implementations, the anchor insert 266 includes one or more anchor members 265 to which the network cable(s) can be secured (e.g., via cable ties). In certain examples, the anchor members 265 align with some of the apertures 260. The anchor insert 266 may define an open slot 267 that aligns with one of the apertures 260. The network cable can be tied or otherwise secured to one or more of the anchor members 265 and routed into the aperture 260 through the open slot 267. In certain examples, a gasket 268 also may be mounted at the aperture 260 to protect the network cable.

In use, the network cable is routed to the chassis 205 and anchored to the chassis sidewall. The splice tray mounting arrangement 220 is removed from the chassis 205 through the open rear 206. The user may rotate the splice tray mounting arrangement 220 to unwind a coil of excess fiber length from around the bend radius limiters 227. The user positions the splice tray mounting arrangement 220 at a workstation. The user then routes an unterminated end of the network cable to the workstation. In certain examples, the user ensures that the portion of the network cable and the portion of the distribution cable 230 routed from the rear 206 of the chassis 205 to the workstation have about the same length.

The user optically couples (e.g., splices) unterminated ends of the fibers of the network cable to unterminated ends of the fibers 231 of the distribution cable 230. The user stores the splices within the splice holders of the splice trays 225. When finished with the optical coupling, the user stacks the splice trays 225 back on the splice tray mounting arrangement 220. The user then winds excess length of both the network cable and the distribution cable 230 around the bend radius limiter arrangement 226 of the splice tray mounting arrangement 220. For example, the user may rotate the splice tray mounting arrangement 220 to coil the excess cable length around the bend radius limiters 227. The user inserts the splice tray mounting arrangement 220 into the chassis 205 through the open rear 206 of the chassis 205. The user covers the open rear 206 with the door 207.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fiber distribution terminal comprising:
   a chassis;
   a plurality of optical adapters disposed at the chassis, the optical adapters having internal-facing ports and external-facing ports;
   a splice tray mounting arrangement that is removably coupled to the chassis, the splice tray mounting arrangement including a base carrying a splice tray mounting location so that removing the splice tray mounting arrangement from the chassis also removes the splice tray mounting location from the chassis, the splice tray mounting location being configured to receive a plurality of splice trays, the splice tray mounting arrangement also including a bend radius management arrangement carried by the base, the bend radius management arrangement being configured to route an optical cable around the splice tray mounting location to store excess length of the optical cable;
   a splice tray mounted at the splice tray mounting location; and
   an optical cable including a plurality of optical fibers having first ends terminated at optical fiber connectors and second ends that are unterminated, the optical fiber connectors being received at the internal-facing ports of the optical adapters, at least some of the unterminated ends being received at the splice tray.

2. The fiber distribution terminal of claim 1, wherein the splice tray is a first splice tray; and wherein a plurality of splice trays including the first splice tray are received at the splice tray mounting location.

3. The fiber distribution terminal of claim 2, wherein the splice tray mounting location includes mounting structure configured to separately receive each splice tray so that the splice trays are independently movable relative to the splice tray mounting arrangement.

4. The fiber distribution terminal of claim 3, wherein the splice trays independently pivot relative to each other at the mounting structure.

5. The fiber distribution terminal of claim 1, wherein the splice tray is configured to hold a plurality of mass fusion splices.

6. The fiber distribution terminal of claim 1, wherein the optical cable is sheathed in a mesh sleeve.

7. The fiber distribution terminal of claim 1, wherein the optical cable includes at least 288 optical fibers.

8. The fiber distribution terminal of claim 1, wherein the optical cable has an excess length of at least six feet.

9. The fiber distribution terminal of claim 1, wherein the optical adapters are carried by a plurality of cassettes disposed at the chassis.

10. The fiber distribution terminal of claim 9, wherein each cassette outputs an optical fiber ribbon that forms part of the optical cable.

11. The fiber distribution terminal of claim 10, wherein the optical fiber ribbons of at least some of the cassettes are joined together as the optical cable.

12. The fiber distribution terminal of claim 9, wherein the cassettes are disposed at a front of the chassis and the splice tray mounting arrangement is disposed at a rear of the chassis.

13. The fiber distribution terminal of claim 1, wherein the splice tray mounting arrangement is elevated above a bottom of the chassis to provide a gap between the splice tray mounting arrangement and the bottom of the chassis.

14. The fiber distribution terminal of claim 1, further comprising a rear cover that mounts to a rear of the chassis to enclose the splice tray mounting arrangement.

15. The fiber distribution terminal of claim 1, wherein the splice tray mounting arrangement is removable from the chassis by sliding the splice tray mounting arrangement out through a rear of the chassis and unwinding the optical cable from around the bend radius management arrangement to reach a workstation spaced from the chassis.

16. The fiber distribution terminal of claim 1, wherein the base of the splice tray mounting arrangement slides within guides defined at interior walls of the chassis.

17. The fiber distribution terminal of claim 1, wherein the base of the splice tray mounting arrangement slides over glides disposed at interior walls of the chassis.

18. The fiber distribution terminal of claim 17, wherein sidewalls of the splice tray mounting arrangement slide beneath top glides.

19. The fiber distribution terminal of claim 1, wherein the bend radius management arrangement includes a plurality of bend radius limiters mounted about the splice tray mounting location.

20. The fiber distribution terminal of claim 1, wherein the bend radius management arrangement includes a cable spool.

21. A fiber distribution terminal comprising:
a chassis;
a plurality of optical adapters disposed at the chassis, the optical adapters having internal-facing ports and external-facing ports, wherein the optical adapters are carried by a plurality of cassettes disposed at the chassis, wherein the cassettes are disposed at a front of the chassis; and
a splice tray mounting arrangement that is removably coupled to the chassis, the splice tray mounting arrangement being disposed at a rear of the chassis, the splice tray mounting arrangement including a base carrying a splice tray mounting location so that removing the splice tray mounting arrangement from the chassis also removes the splice tray mounting location from the chassis, the splice tray mounting location being configured to receive a plurality of splice trays, the splice tray mounting arrangement also including a bend radius management arrangement carried by the base, the bend radius management arrangement being configured to route an optical cable around the splice tray mounting location to store excess length of the optical cable.

22. A fiber distribution terminal comprising:
a chassis;
a plurality of optical adapters disposed at the chassis, the optical adapters having internal-facing ports and external-facing ports;
a splice tray mounting arrangement that is removably coupled to the chassis, the splice tray mounting arrangement including a base carrying a splice tray mounting location so that removing the splice tray mounting arrangement from the chassis also removes the splice tray mounting location from the chassis, the splice tray mounting location being configured to receive a plurality of splice trays, the splice tray mounting arrangement also including a bend radius management arrangement carried by the base, the bend radius management arrangement being configured to route an optical cable around the splice tray mounting location to store excess length of the optical cable; and
a first splice tray mounted at the splice tray mounting location, and wherein a plurality of splice trays including the first splice tray are received at the splice tray mounting location; the splice tray mounting location includes mounting structure configured to separately receive each splice tray so that the splice trays are independently movable relative to the splice tray mounting arrangement, wherein the splice trays independently pivot relative to each other at the mounting structure.

23. A fiber distribution terminal comprising:
a chassis;
a plurality of optical adapters disposed at the chassis, the optical adapters having internal-facing ports and external-facing ports;
a splice tray mounting arrangement that is removably coupled to the chassis, the splice tray mounting arrangement including a base carrying a splice tray mounting location so that removing the splice tray mounting arrangement from the chassis also removes the splice tray mounting location from the chassis, the splice tray mounting location being configured to receive a plurality of splice trays, the splice tray mounting arrangement also including a bend radius management arrangement carried by the base, the bend radius management arrangement being configured to route an optical cable around the splice tray mounting location to store excess length of the optical cable, wherein the splice tray mounting arrangement is removable from the chassis by sliding the splice tray mounting arrangement out through the rear of the chassis and unwinding the optical cable from around the bend radius management arrangement to reach a workstation spaced from the chassis.

* * * * *